United States Patent
Dambrine et al.

(10) Patent No.: US 6,174,570 B1
(45) Date of Patent: Jan. 16, 2001

(54) METHOD FOR METAL COATING OF FIBRES BY LIQUID PROCESS

(75) Inventors: Bruno Jacques Gérard Dambrine, Le Mee S/Seine; Marcel Garnier, Uriage; Jean Hamburger, St Nazaire les Eymes; Yves Christian Louis Alain Honnorat, deceased, late of Gometz la Ville, by Paule Honnorat, administratrix; Ludovic Edmond Camille Molliex, Brunoy; José Feigenblum, Grenoble; Gérard Weiss, Mennecy, all of (FR)

(73) Assignee: Societe Nationale d'Etude et de Construction de Moteurs d'Aviation "SNECMA", Paris (FR)

( * ) Notice: Under 35 U.S.C. 154(b), the term of this patent shall be extended for 0 days.

(21) Appl. No.: 09/381,296
(22) PCT Filed: Jan. 21, 1999
(86) PCT No.: PCT/FR99/00116
 § 371 Date: Sep. 22, 1999
 § 102(e) Date: Sep. 22, 1999
(87) PCT Pub. No.: WO99/37828
 PCT Pub. Date: Jul. 29, 1999

(30) Foreign Application Priority Data

Jan. 22, 1998 (FR) .................................................. 98 00644

(51) Int. Cl.$^7$ .......................................................... B05D 1/18
(52) U.S. Cl. .................. 427/434.7; 427/431; 427/434.2; 427/434.5; 427/434.6
(58) Field of Search ................................ 427/431, 434.2, 427/434.5, 434.6, 434.7

(56) References Cited

U.S. PATENT DOCUMENTS

| 3,758,329 | * | 9/1973 | Garick . |
| 5,382,456 | * | 1/1995 | Hocking et al. .................. 427/434.6 |
| 5,662,969 | * | 9/1997 | Ling ..................................... 427/591 |
| 5,965,210 | * | 10/1999 | Tada et al. ........................ 427/434.7 |

FOREIGN PATENT DOCUMENTS

| 3718178 | * | 12/1988 | (DE) . |
| 2649625 | * | 1/1991 | (FR) . |
| 95/20684 | * | 8/1995 | (WO) . |

OTHER PUBLICATIONS

Japanese patent abstract 04099160 by Shigeo; Patent Abstracts of Japan; abstract, Mar., 1992.*

* cited by examiner

Primary Examiner—Timothy Meeks
Assistant Examiner—Michael Barr
(74) Attorney, Agent, or Firm—Oblon, Spivak, McClelland, Maier & Neustadt, P.C.

(57) ABSTRACT

The invention concerns a method for metal coating of fibres (15) by liquid process, said method being particularly but not exclusively designed for coating in thick and even layers (22) with metals and metal alloys having high melting point and reactivity. Said method is characterised in that it consists in moving along the stretched fibre (15) in the liquid metal maintained in levitation in a well (1), said fibre (15) passing through orifices (6, 7) provided in the well (1) wall (3), said orifices (6, 7) being arranged on either side of the liquid metal at places where the liquid metal (10) is not in contact with said wall (3).

13 Claims, 4 Drawing Sheets

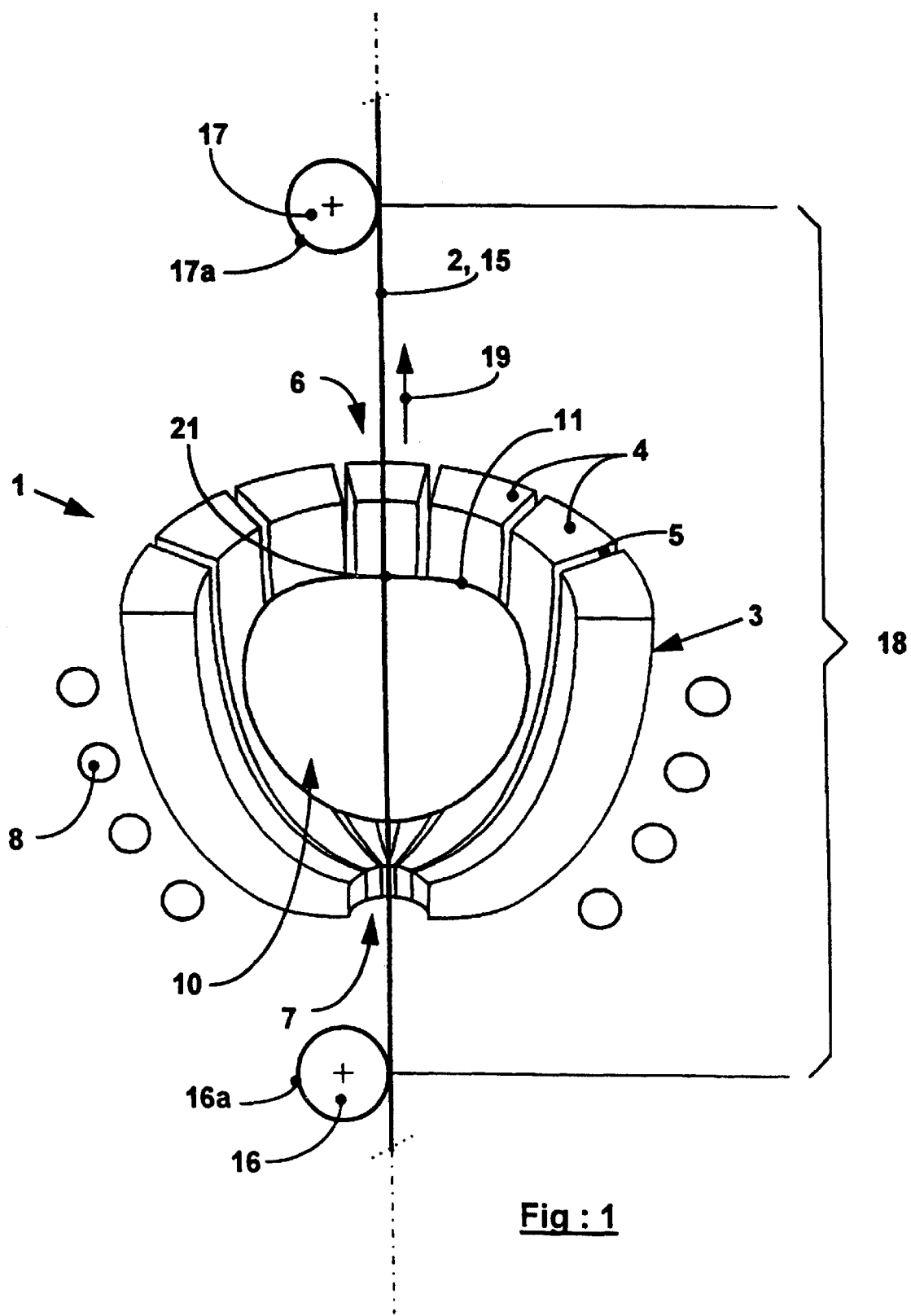
Fig : 1

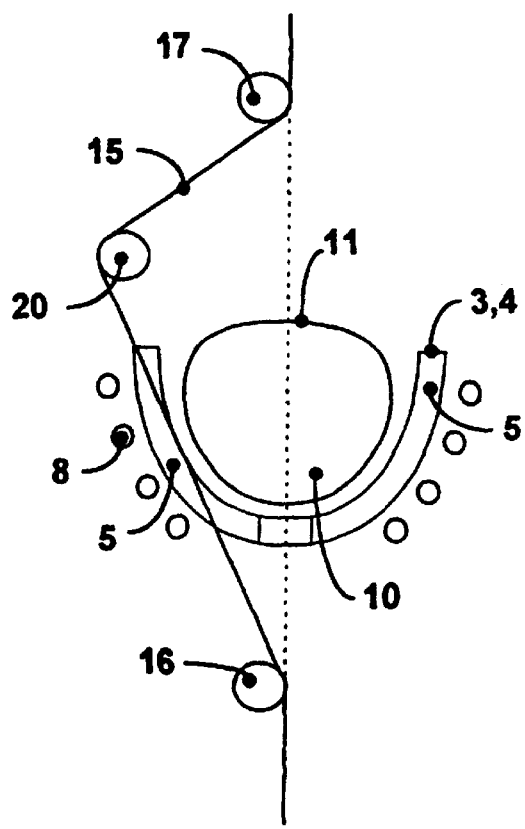
Fig : 2
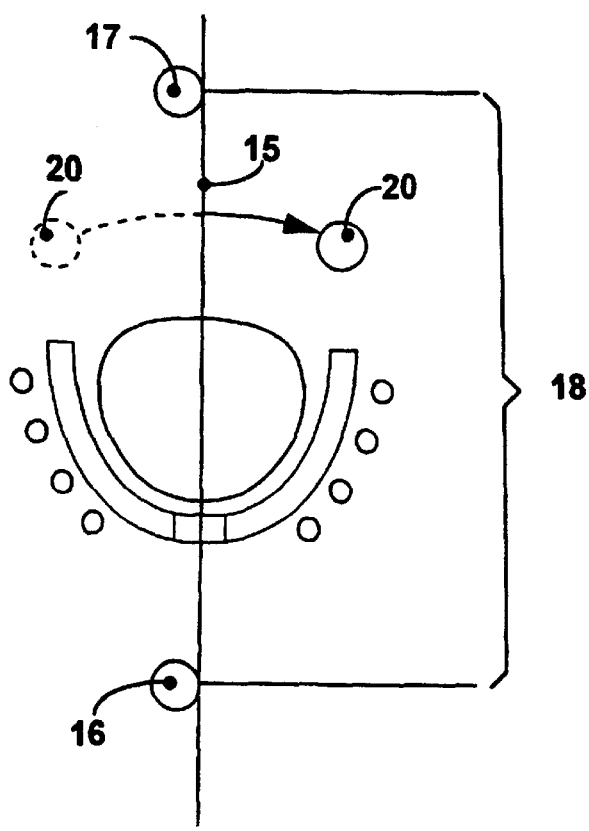
Fig : 3
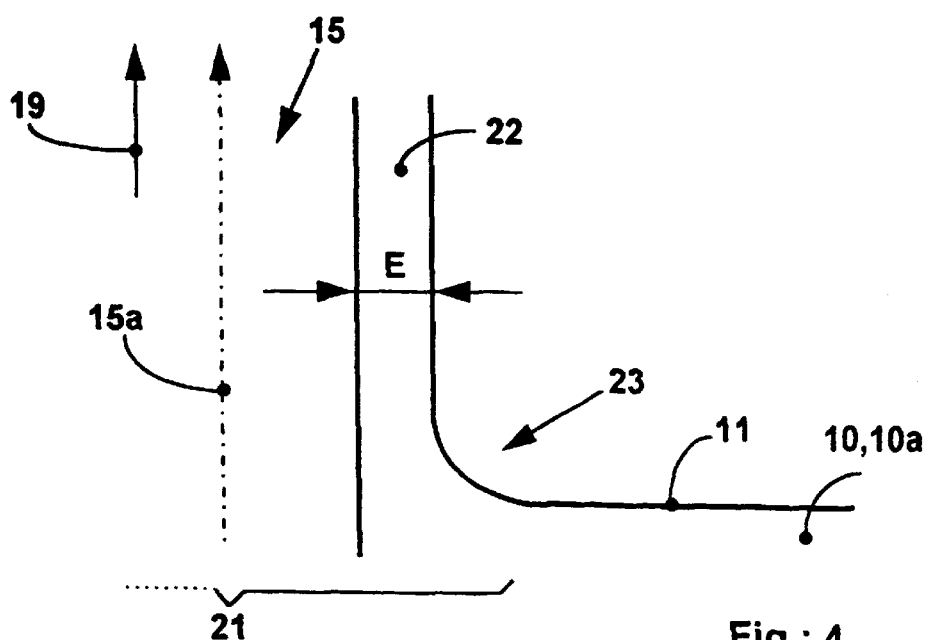
Fig : 4

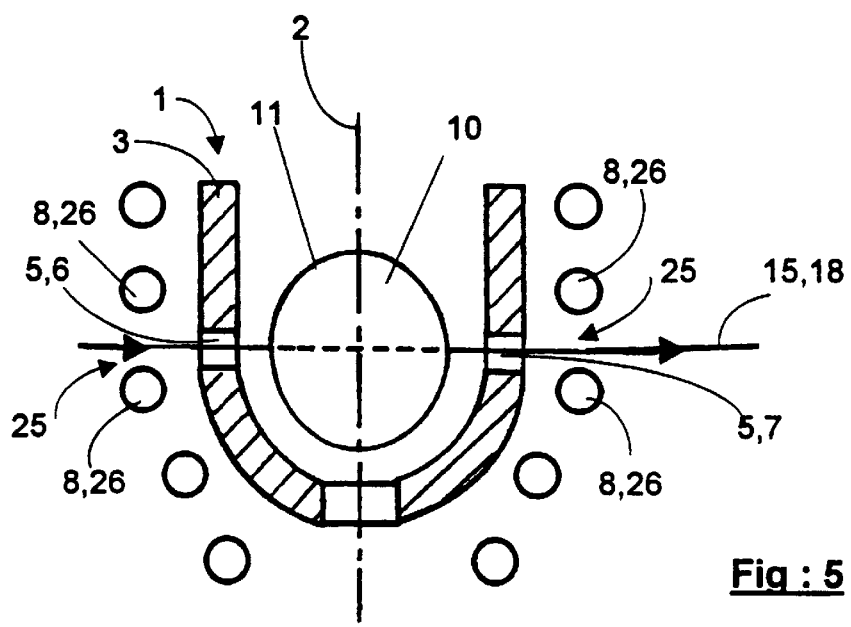
Fig : 5
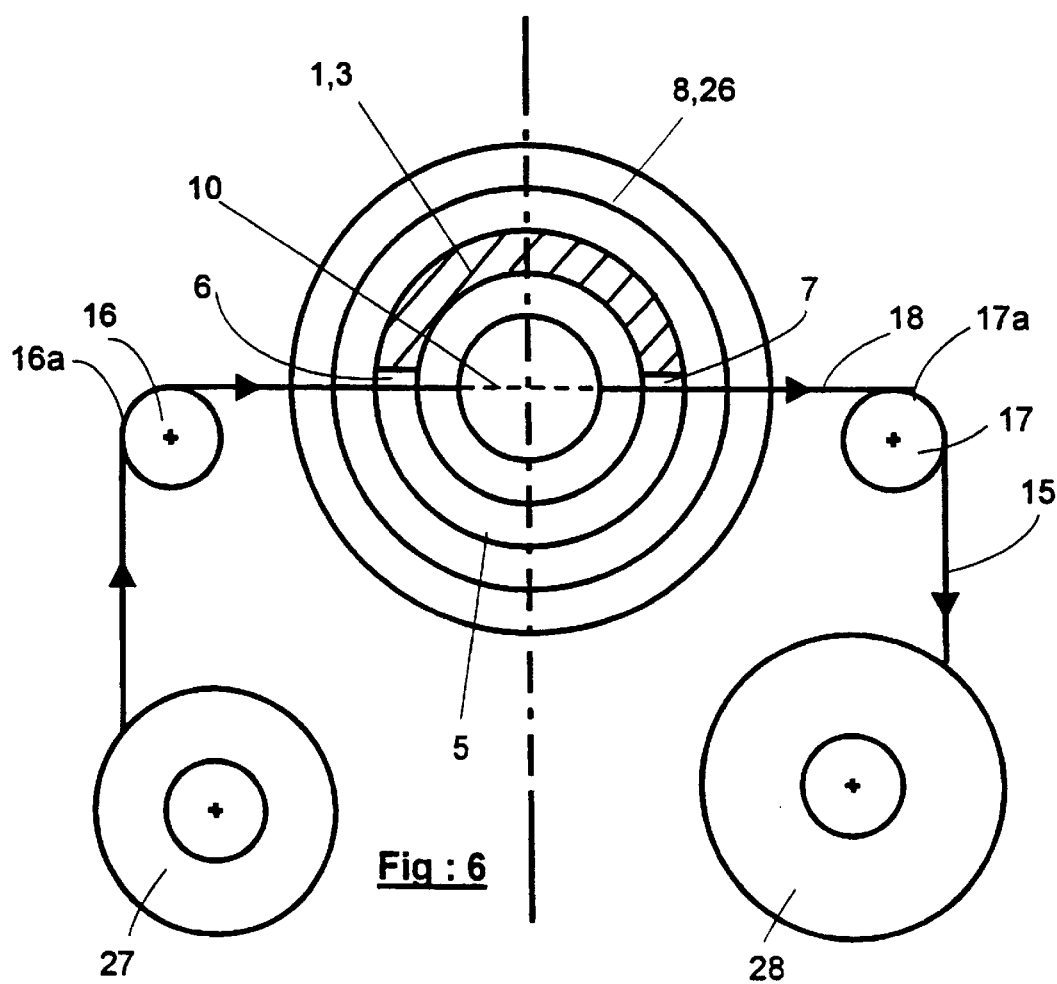
Fig : 6

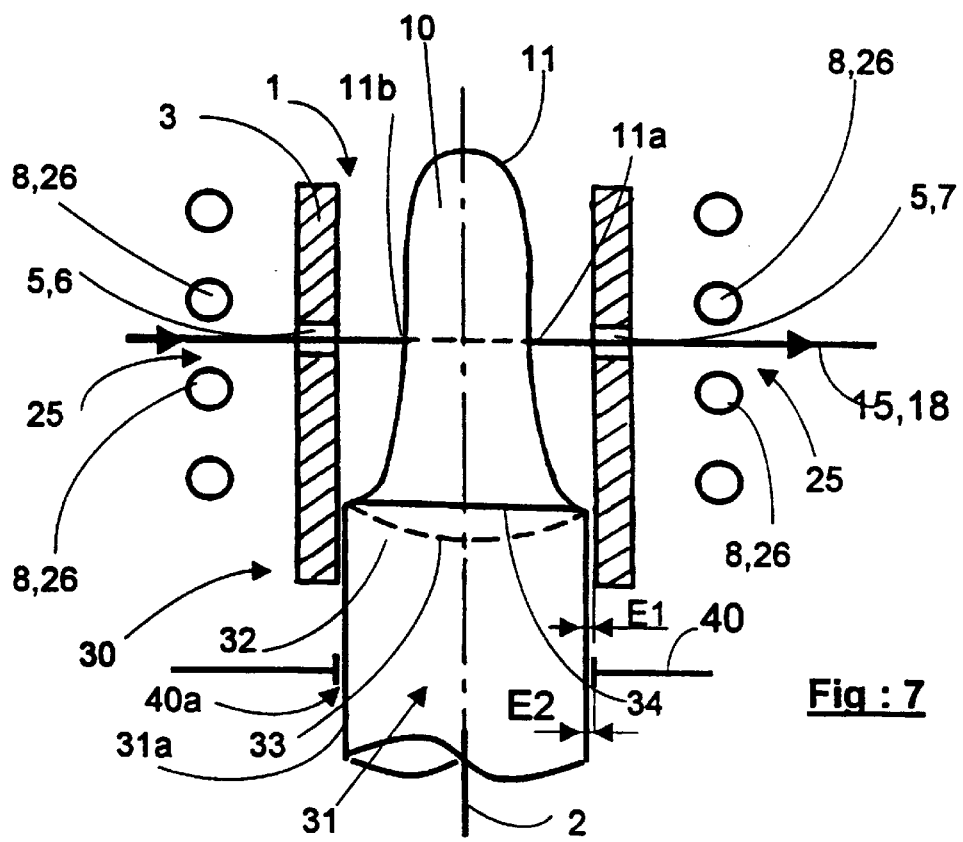
Fig : 7
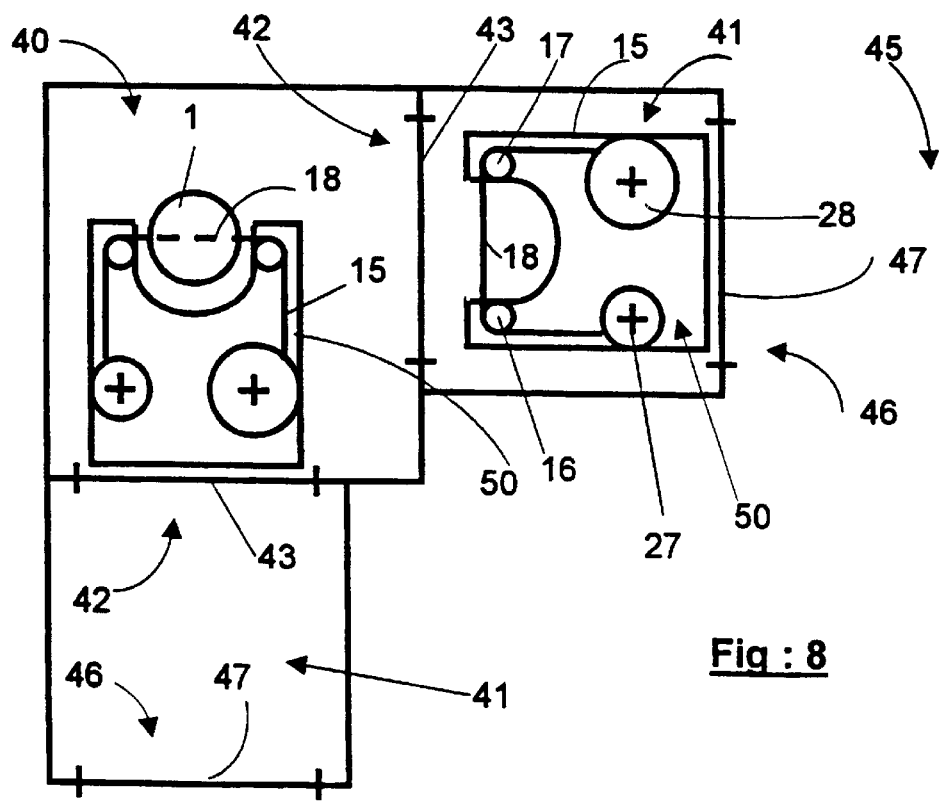
Fig : 8

METHOD FOR METAL COATING OF FIBRES BY LIQUID PROCESS

BACKGROUND OF THE INVENTION

1. Field of the Invention

The invention relates to a process for coating fibers by dipping them into liquid metal and, more particularly but not exclusively, to a process making it possible to obtain a thick and uniform coating of metal that can have a high melting point and a high reactivity, such as titanium alloys.

2. Discussion of the Background

The most promising materials for reducing the mass of products intended for the aeronautics or space industry, particularly turbojets, are metal-matrix composites consisting of a matrix based on a metal alloy reinforced by fibers, said fibers being, for example, ceramic fibers. These materials have a high level of performance in terms of stiffness and strength, and they can be used instead of monolithic alloys for producing components such as compressor or turbine disks, shafts or actuator bodies, it being possible for these materials also be to be used as local reinforcements in blades, casings, spacers, etc. The mass savings achieved with the components vary from 15 to 70%, depending on the applications, their overall size is reduced and their lifetime significantly increased. These materials are also useful in other sectors in which a field of volume forces is applied to a component, for example a pressure shell such as a gun barrel or a tank for fluid under pressure.

Patent FR 2,684,578 describes a process for manufacturing components made of a metal-matrix composite material which uses ceramic fibers coated with the material of the metal matrix, these fibers then being wound and pressed at the isothermal forging temperature of the matrix material. The coating may be carried out in the vapor phase in an electric field, by electrophoresis using metal powders, or by dipping them into a bath of liquid metal. The ratio between the fiber volume and the total volume of the fiber+matrix material is typically, but not necessarily, approximately 30%, which leads to the fibers being coated with a layer of metal whose thickness is very much greater than that of an ordinary surface treatment. For example, a 100 $\mu$m diameter fiber must, under these conditions, be coated with a thickness E of metal equal to 35 $\mu$m. Moreover, the thickness of the coating must be very uniform so as to guarantee a constant separation of the fibers in the composite material. If this were not the case, stress concentrations would be produced under load, which would substantially reduce the fatigue strength of the composite material, with the fibers breaking or the matrix cracking. This well-known phenomenon stems from the large difference between the Young's moduli of the fiber and the matrix material. Typically, silicon carbide SiC ceramic fibers have a Young's modulus of about 500 GPa whereas a matrix made of a titanium alloy such as TA6V has a Young's modulus of about 100 GPa. Finally, such materials with a high strength/mass ratio are of great interest, especially for the aeronautics and space industry, but their high manufacturing cost constitutes a brake on their development, this high manufacturing cost stemming both from the cost of the materials used and from the complexity of the known manufacturing processes employed.

In order to coat the fibers, the use of the vapor deposition process in an electric field has several drawbacks which make it not very profitable from an industrial standpoint:

This process is very slow since the rate of metal deposited is low while the coating to be produced is thick.

A large amount of metal is deposited on the instruments and the walls of the chamber. Not only is this metal lost, but the work must also often be interrupted in order to clean the plant.

The plant is expensive and consequently can be amortized only over major production runs.

Finally, only certain metal alloys can be used with this coating method.

The dip-coating process is the most rapid in its principle and U.S. Pat. No. 5,049,419 gives an example of its implementation: The fiber passes through the liquid metal held in a crucible, this fiber being kept tensioned by three idler pulleys, one of which is immersed in the liquid metal. However, this process has the drawback of being difficult to use with alloys having a high melting point and/or reactivity, since the ability of the idler pulley and, more generally, of the mechanical components immersed in the liquid metal to withstand such conditions is very limited or even nonexistent. It is known to protect the internal wall of the crucible by an oxide such as alumina, but only yttria $Y_2O_3$, which is very expensive, can be used in the presence of a titanium alloy. Moreover, an oxide coating does not solve the problem caused by the pulley being immersed in the liquid metal.

The so-called "Landau's" law, which allows the thickness of the metal layer thus deposited on the fiber to be determined as a function of various parameters, is known. However, this law does not properly apply to all the ranges of values that these parameters may have in an industrial process. This law is applicable for low unwinding speeds of the wire.

Also known, for example from Patent FR 2,649,625, is a so-called "cold" crucible in which the liquid metal is held in levitation by an electromagnetic field produced by a helical electromagnetic inductor surrounding the crucible. Such crucibles are designed and used to prevent contamination of the liquid metal by the material of which the wall of the crucible is made. Also known, from a summary of Japanese Patent JP 4099160, is a process for coating a tape with metal, the said process consisting in making said tape run vertically into an induction crucible containing liquid metal, said tape passing through an orifice located at the bottom of the crucible and through the opening above the crucible, said orifice being shifted toward the edge of the crucible and said liquid metal being moved away from the orifice by a partial levitation created by the inductor. An advantage of this process is that it makes it possible to dispense with any mechanical member immersed in the liquid metal. A first drawback of this process is that it makes it difficult to introduce the tape into the liquid metal. A second drawback of the process is that it gives the metal layer deposited on the surface of the tape a nonuniform thickness, since the tape runs through the surface of the liquid metal very obliquely.

SUMMARY OF THE INVENTION

The invention proposes a liquid process for coating fibers with metal, said process being more particularly but not exclusively intended for coating with metals and metal alloys having a high melting point and a high reactivity, said process simplifying the handling of the fiber, said process essentially comprising the following operations:

a) holding the liquid metal in a crucible at the appropriate temperature;

b) drawing the tensioned fiber through the liquid metal;

c) the crucible being of the "levitation" type and at least partially preventing contact between the liquid metal and the wall of the crucible.

Such a process is noteworthy in that:

d) the wall of the crucible has two orifices located on either side of the liquid metal, at points where the liquid metal does not come into contact with said wall of the crucible, said orifices being connected by a slot in the wall of the crucible, said slot bringing the inside of the crucible into communication with the outside, said slot having the shape of a controlled surface and having a sufficient width, said slot being located at a point where the liquid metal does not come into contact with the wall of the crucible;

e) the fiber is drawn and held tensioned along a straight segment between means of preemption of said fiber, said preemption means being external to the crucible;

f) the fiber is introduced into the crucible by making it pass through the slot in a path transverse to said fiber;

g) the straight fiber segment passes through a first orifice, runs through the liquid metal inside the crucible and emerges via the second orifice.

It will be understood that the crucible makes it possible to hold, without any loss, by levitation, a sufficient amount of liquid metal around a straight segment of drawn fiber held tensioned by the preemption means external to said liquid metal. It will also be understood that, because the mechanical members immersed in the liquid metal are no longer necessary, the process makes it possible to improve the longevity of the equipment significantly and it can be applied to very reactive metals having a high melting point, such as titanium alloys.

It will also be understood that the slot constitutes a passage for the tensioned fiber from the outside of the crucible to the orifices, and thus makes it possible to introduce the fiber kept tensioned by the preemption means into the orifices, this being achieved by a simple movement of said fiber in the slot. A person skilled in the art will define the width of the slot depending on the inaccuracies in positioning the fiber with respect to its theoretical position during the movement. It will be understood that the levitation effect prevents the liquid metal from also passing into the slot. Thus, the fiber will be introduced into the crucible by making it pass through the slot in a path transverse to said slot and the fiber will be withdrawn from the crucible by also making it pass through the slot in a path transverse to said fiber; but in the opposite direction.

The fiber is drawn at an appropriate speed in order to obtain a coating with the chosen thickness.

The possibility of holding a sufficient amount of liquid metal around the fiber, this amount being limited only by the capacity of the crucible, makes it possible to produce a uniform coating on the fiber with a simple and noncritical control of the levitation of the liquid metal. In fact, a person skilled in the art can position the fiber at a sufficient distance from the surface of the liquid metal, that is to say so as to make it pass into the central region of the volume of liquid metal, so that this liquid metal can vary in position and in volume without losing contact with the fiber, the variation in volume arising from the as yet unreplenished consumption of metal required for forming the metal layer around the fiber, the variations in the position of the liquid metal arising from the as yet unreplenished consumption of metal and from the tolerances on controlling the levitation.

Another advantage of the process is that it reduces the degradation of the fiber during coating with liquid metal under the effect of the heat. This is because the tensioned fiber is straight, at least inside the crucible, thereby reducing the path to be traveled and consequently reducing the transit time of the fiber in the crucible.

Compared with the process of vapor deposition in an electric field, the process according to the invention makes it possible to deposit the liquid metal on the fiber at a very high rate and with a simple, and therefore inexpensive and rapidly amortized, plant. In addition, it results in no loss of metal.

Also advantageously, the fiber will be made to emerge from the surface of the liquid metal in a direction approximately perpendicular to said surface at the point of exit. Such an arrangement has the effect of giving said surface an axial symmetry with respect to the fiber in close proximity to said point of exit. It therefore makes it possible for the field of pressures which are produced by the surface tension of the liquid metal during its deposition on the fiber to be made symmetrical and, consequently to improve the constancy of the thickness of the metal layer around the fiber.

Also advantageously, the fiber will be made to emerge from the surface of the liquid metal in an approximately vertical direction. Such an arrangement has the effect of making the gravitational field axisymmetric with respect to the fiber in the vicinity of the point of exit and has the result of further improving the constancy of the thickness of the metal layer around the fiber.

Also advantageously, the crucible and the inductor which surrounds it will have the shape of a body of revolution about a geometrical axis and the fiber will be made to emerge from the surface of the liquid metal approximately along this geometrical axis. Such an arrangement has the effect of giving the electromagnetic field generated by the inductor in the liquid metal an axial symmetry with respect to the fiber, at least in the vicinity of the point of exit, and has the result of further improving the constancy of the thickness of the metal layer around the fiber.

Again advantageously, a crucible will be used which is placed vertically with one orifice facing downward and the other upward, the fiber entering via the orifice at the bottom, running through the liquid metal from the bottom up and emerging via the orifice at the top. Such an arrangement has the effect of orienting the levitation forces in the direction and sense of the wire emerging from the liquid metal and has the result of promoting the deposition and retention of the liquid metal on the fiber and therefore of allowing a thicker layer of metal to be obtained. Preferably, but not necessarily, the crucible will be axisymmetric with respect to the fiber running through it.

However, in a preferred method of implementation of the invention which ensures high productivity, the two orifices for passage of the fiber and the slot connecting them are positioned opposite the space between two turns of the inductor, and the fiber, tensioned from outside the crucible and inductor assembly, is introduced into the crucible by making it pass between the two turns of the inductor and through the slot, this being always in a path transverse to said fiber.

It will be understood that positioning the slot opposite the space between two turns of the inductor makes it possible to extend the passage of the fiber outside the inductor, thereby further simplifying the introduction of the fiber into the crucible. This is because the fiber can be mounted and tensioned on the preemption means completely outside the crucible and inductor assembly, or even at a point remote from this assembly, said fiber then being introduced into the crucible by moving the thus constituted fiber and preemption means assembly.

Advantageously, the crucible is fed with metal according to the following method:

a. a feed opening is placed in the bottom of the crucible and below the inductor, said feed opening facing downward;

b. a bar of metal is introduced via the feed opening and the upper end of said bar is raised into the crucible inside the inductor;

c. the liquid metal is shifted away from the edge of the feed opening by the levitation effect, said shift taking place at least over a distance equal to the gap E1 left between the bar and the edge of the feed opening.

It will be understood that the upper part of the bar melts upon penetrating the inside of the inductor, the liquid metal thus produced feeding the crucible. The bar is introduced gradually, depending on the need for liquid-metal production.

It will be understood that the levitation effect interacts with the bar in order to ensure that the crucible is leaktight and thus to prevent the liquid metal from flowing out via the gap E1 left between the bar and the edge of the feed opening, said levitation effect pushing the liquid metal away from the edge of the feed opening, said gap E1 being necessary for allowing said bar to pass through said feed opening, said bar being by definition solid. The intensity of the magnetic field at the edge of the feed opening is not critical, this intensity having only to be sufficient to ensure that the crucible is leaktight. However, those skilled in the art will take care to ensure that this intensity is limited so as to keep the metal of the bar in the solid state starting from and outside the feed opening, which makes it possible to ensure that the crucible is leaktight. This is because it will be understood that an excessive intensity would cause the bar to melt beyond the opening on the outside of the crucible, said melting running the risk of causing the liquid metal contained in the crucible to flow, under gravity, through said feed opening.

It will be understood that the gap E1 is a mechanical clearance necessary for allowing the bar to pass through the feed opening.

The invention has the advantage of properly stabilizing the shape of the mass of liquid metal and of avoiding in it the more or less damped vibrations which would result from a batchwise feed carried out by throwing pieces of metal into the crucible. In fact, the bar comes into contact with the liquid metal from below and the newly liquefied metal gradually mixes with the metal which is already liquid, overcoming gravity.

Advantageously, a cylindrical crucible with no bottom will be used, the feed opening then coinciding with the lower end of the crucible, a dome of liquid metal forming in the crucible above the bar. Such an arrangement makes it possible to use a bar of the maximum diameter compatible with the size of the crucible, said bar thus reaching a diameter close to the internal diameter of the crucible, which makes it possible to increase, without making the overall size of the plant excessive, the amount of metal available at the inlet of the crucible and, consequently, to increase the capacity of the crucible to supply liquid metal in quantity.

Advantageously, since the crucible is placed inside a chamber containing a pressurized inert gas, an opening will be made in the wall of the chamber, said opening in the chamber bringing the inside of the chamber into communication with the outside, said opening in the chamber being placed so as to face the feed opening of the crucible, and the bar will be simultaneously made to pass through this opening with a smaller gap E2 and through the feed opening of the crucible under the aforementioned conditions.

Such a process allows a chamber of smaller size to be used since the crucible is fed from outside the chamber by passing the bar simultaneously through the opening in the chamber and through the feed opening of the crucible. It will be understood that the pressurized gas represents an obstacle to the ambient air and prevents it from penetrating into the chamber via the gap E2 left between the bar and the opening in the chamber. Since the assembly consisting of the chamber, the crucible and the inductor is smaller in size, they [sic] can be moved or handled easily without, however, prejudicing its capacity to supply liquid metal in quantity.

It will be understood that the gap E2 between the lateral surface of the bar and the edge of the opening in the chamber is a mechanical clearance necessary for said bar to pass through. Those skilled in the art will reduce this gap E2 to the strictly necessary value compatible with the inaccuracies in the geometry of the lateral surface of the bar, said accuracy possibly being improved by grinding said lateral surface.

BRIEF DESCRIPTION OF THE DRAWINGS

The invention will be more clearly understood and the advantages that it provides will be more clearly apparent with regard to a detailed embodiment and to the appended figures.

FIG. 1 illustrates, by means of a sectional view, the coating of the fiber with the liquid metal held in a levitation crucible.

FIG. 2 illustrates, by means of a sectional view of this same assembly, the extraction of the fiber from he liquid metal.

FIG. 3 illustrates, by means of this same sectional view, the introduction of the fiber into the liquid metal.

FIG. 4 illustrates, by means of a highly enlarged half-section, the fiber leaving the liquid metal.

FIGS. 5 and 6 illustrate, by means of a sectional view and a top view, the fiber passing between the turns of the inductor.

FIG. 7 illustrates a cylindrical crucible fed from below by a bar of metal, said crucible being inside a chamber.

FIG. 8 illustrates an industrial plant for implementing the process in its preferred form.

DESCRIPTION OF THE PREFERRED EMBODIMENTS

Reference will firstly be made to FIG. 1. The crucible 1 is of the "cold crucible" type, also called a "levitation crucible", and has the general shape of a body of revolution about the vertical geometrical axis 2. The crucible 1 has a side wall 3 composed of a plurality of sectors 4 which are cooled by the circulation (not illustrated) of fluid, said sectors 4 being separated from each other by as many radial slots 5. The crucible 1 has approximately the shape of a bowl with, at the top, a wide upper orifice 6 and, at the bottom, a narrow lower orifice 7, said orifices 6, 7 being circular and centered on the geometrical axis 2, said orifices 6, 7 bordering the side wall 3, said slots 5 reaching as far as the orifices 6, 7. The crucible 1 is surrounded laterally and from below by a helical inductor 8 also of geometrical axis 2. A pseudosphere of liquid metal 10 is held at the appropriate temperature and in levitation inside the crucible 1, the surface 11 of said liquid metal 10 being shifted away from the wall 3 by the levitation effect.

The fiber 15 is held tensioned between preemption means consisting, in this example, of a lower idler pulley 16 and an upper idler pulley 17, said idler pulleys 16, 17 being on either side of the crucible 1, said idler pulleys 16, 17 each having a bearing face, namely 16a and 17a respectively, said bearing faces 16a, 17a being tangential to the geometrical axis 2, said fiber 15 forming a straight segment 18 between the idler pulleys 16 and 17, said straight segment 18 being along the geometrical axis 2, said fiber 15 in the straight segment 18 running, in succession and from the bottom up, through the lower orifice 7, the liquid metal 10 and the upper orifice 6 at a speed V represented by the speed vector 19. It will be understood that the idler pulleys 16 and 17 ensure at the same time that the fiber 15 is positioned and guided in the liquid metal 10. The plant also includes (not illustrated) a pay-out reel of fiber 15, a take-up reel, a drive motor and means allowing the accelerations and decelerations in the speed of rotation of the reels to be moderated, according to the techniques known to those skilled in the art, so as not to break the fiber 15 when starting or stopping the fiber 15 running. Moreover, the point of exit via which the fiber 15 emerges from the surface 11 of the liquid metal 10 will be labeled 21.

Reference will now be made to FIG. 2 [sic]. A movable idler pulley 20 placed above the crucible 1 between the lower idler pulley 16 and the upper idler pulley 17 shifts the fiber 15 away from the geometrical axis 2 and from the liquid metal 10, said fiber passing into one of the slots 5 between the sectors 4. It will be understood that the fiber 15 passes through the space lying between the liquid metal 10 and the inductor 8, said fiber 15 then no longer being in contact with said liquid metal 10.

Reference will now be made to FIG. 3. This same movable idler pulley 20 has now switched on the other side of the geometrical axis 2 and the tensioned fiber 15 then forms a straight segment 18 between the upper idler pulley 17 and the lower idler pulley 16, said fiber 15 therefore passing into the liquid metal 10.

Reference will now be made to FIG. 4. The fiber 15, of circular cross section along the geometrical axis 15*a* emerges from the surface 11 of the pool labeled 10*a* of liquid metal 10 at a speed V represented by the speed vector 19. The layer of liquid metal which has formed around the fiber 15 will be labeled 22. In the region where the fiber 15 leaves the pool 10*a*, the liquid metal 10 experiences a complex set of opposing stresses tending to entrain and retain the liquid metal 10 around the fiber 15, or on the contrary to retain it in the pool 10*a*. The influencing parameters are: the draw speed V of the fiber 15, the viscosity of the liquid metal 10, said viscosity depending on the composition and on the temperature of said liquid metal 10, the surface tension of the liquid metal 10, said surface tension forming the concave meniscus 23 surrounding the fiber 15 at the point where it leaves the pool 10*a*, and, to a lesser degree: the Earth's gravitation, the electromagnetic field generated by the inductor 8 and the density of the liquid metal 10. It will be noted that the relative influence of each of these parameters depends on the values of all of the parameters and it is difficult, under these conditions, to formulate laws which apply under all the conditions in which the process is implemented. Consequently, a person skilled in the art will make a first approximation by applying the well-known law called "Landau's law" and will subsequently refine the implementation of the process by a few experiments. It should be pointed out that the aforementioned influencing parameters are easy to control. The process will consequently give a repeatable result.

If it is desired to manufacture a fiber+metal matrix composite material comprising 30% of fiber 15 by volume, said metal matrix being a titanium alloy, said fiber 15 being made of silicon carbide SiC, said fiber 15 having a diameter of 100 $\mu$m and being covered with a 3 to 4 $\mu$m carbon interface, a 35 $\mu$m layer 22 is obtained in two passes at a draw speed V=4 m/s. This process thus makes it possible to coat 1500 m of fiber 15 in less than 13 minutes with 105 g of titanium alloy, i.e. 23 cm$^3$. At this speed V, the levitating pseudosphere of titanium having a diameter of 100 mm, the fiber 15 remains in the liquid metal 10 for only one 40th of a second, thereby allowing the integrity of the fiber and of the carbon coating to be preserved.

This same 35 $\mu$m layer 22 may be obtained in a single pass at a draw speed V=30 m/s. Moreover, the normal frequencies of the electric current feeding the inductor 8 and allowing the levitation to be maintained are sufficiently high to counteract, by the skin effect, the electric currents created by the eddy-current effect in the metal layer 22. Thus, the fiber itself is not inductively heated. It is cold before entering the liquid metal and cools more rapidly when it emerges therefrom. Under these conditions, the layer 22 solidifies approximately 60 mm from the surface 11 of the liquid metal 10, said surface 11 being heated to 20° C. above the temperature of solidification of the titanium alloy, which is 1650° C. This very short distance allows the coating oven to be of reasonable size, with the fiber running vertically upward.

The maximum coating rate depends essentially on the ability of the plant to accelerate and decelerate the fiber 15, without breaking it, over a length that does not entail excessive losses corresponding to coated fiber with a thickness outside the tolerances.

It is possible to arrange the orifices 6, 7 differently, and consequently to position the segment 18 of fiber 15 with respect to the pseudosphere of liquid metal 10 depending on the arrangement of the plant, but this would in some cases be to the detriment of the uniformity of the layer 22 of liquid metal since the axisymmetry of the forces exerted on the liquid metal 10 in the vicinity of the surface 11 and of the fiber 15 runs the risk of being disturbed thereby. Those skilled in the art will check, by means of a few tests in accordance with their specific conditions of implementation of the process that the irregularities in the layer 22 remain within acceptable limits.

Reference will now be made to both of FIGS. 5 and 6. In a preferred method of implementation of the process ensuring high productivity, the orifices 6, 7 and the slot 5 connecting them are positioned in the lateral part of the wall 3 of the crucible 1, opposite the space 25 between two turns 26 of the helical inductor 8. Thus, the fiber 15 will be introduced from outside the crucible 1+inductor 8 assembly into the crucible 1 by making it pass between two turns of said inductor 8 and through the slot 5 in a path transverse to said fiber 15. Conversely, the fiber 15 will be withdrawn from the crucible 1 by also making it pass through the slot 5 and between the two turns 26 of the inductor 8 in a path transverse to said fiber 15, but in the opposite sense.

The fiber 15 leaves a pay-out reel 27, passes over the bearing face 16*a* of a first idler pulley 16, runs through the crucible 1 and the inductor 8 by passing between two turns 26 of said inductor 8, passes over the bearing face 17*a* of a second idler pulley 17 and is wound up on a take-up reel 28. The idler pulleys 16, 17 may merge with the reels 27, 28.

The fiber 15 may be positioned in order to approach as close as possible the geometrical axis 2 of the crucible 1, so as to cut the surface 11 of the liquid metal 10 as close as possible to the perpendicular to said surface 11.

Reference will now be made to FIG. 7. The crucible 1 has a cylindrical body of revolution about the vertical geometrical axis 2. This crucible 1 has no bottom and is therefore limited to its single side wall 3, the inductor 8 being placed around said side wall 3. The lower end of the side wall 3 constitutes a feed opening 30 via which a cylindrical bar 31 of shape complementary to that of the feed opening 30 passes with a sufficient gap E1. This bar 31 is placed vertically below the crucible 1 and along the geometrical axis 2 of said crucible 1, said bar 31 being gradually raised in an upward movement, said bar 31 being made of the same metal as the liquid metal 10. On penetrating inside the inductor 8, the upper end 32 of the bar 31 liquefies and the liquid metal thus produced forms a dome above said bar 31, more specifically above its upper end 32, this dome of liquid metal 10 rising toward the top of the crucible 1 and being shifted away from the side wall 3 of said crucible 1. The geometrical surface 33 separating the liquid metal 10 from the still-solid bar 31 forms a meniscus whose concavity faces upward, this meniscus 33 reaching the line of intersection 34 between the lateral surface 31a of the bar 31 and the surface 11 of the dome of liquid metal 10, said line of intersection 34 being positioned in the feed opening 30, said liquid metal 10 being above said meniscus 33. The levitation effect shifts the liquid metal 10 away from the side wall 3, especially at the edge of the feed opening 30. Consequently, the liquid metal 10 cannot pass above [sic] the line of intersection 34 and flow under gravity through the gap E1 between the lateral surface 31a of the bar 31 and the edge of the feed opening 30. The liquid metal 10 does not touch the wall 3 of the crucible 1, thereby preventing it from being contaminated by said crucible 1 when said liquid metal 10 is too reactive, for example a titanium alloy. It will be understood that the liquid metal 10 in this example is entirely supported by the bar 31, the levitation effect then being limited to pushing said liquid metal 10 toward the geometrical axis 2 of the crucible 1. As a result, the dome of liquid metal 10 thus formed is very stable and is conducive to uniform coating.

The fiber 15 passes horizontally through the dome of liquid metal 10 preferably at two point of infection 11a and 11b on the surface 11 of said dome, so as to run as perpendicularly as possible through said surface 11. For the same reason, the dome of liquid metal 10 will advantageously be given a height at least equal to twice the internal diameter of the crucible.

The origin of this dome of liquid metal 10 may be explained as follows: the alternating magnetic field created by the inductor generates induced currents and electromagnetic forces in the liquid metal. These forces are located around the periphery of the liquid metal in a surplus layer called the "electromagnetic skin", the depth 8 of which depends on the frequency f of the inductor current and varies as $f^{-\frac{1}{2}}$. When the frequency increases, and therefore the depth δ of the "electromagnetic skin" decreases, the electromagnetic forces tend to become perpendicular to the external surface of the liquid metal, thereby favoring the irrotational component of these forces, resulting in electromagnetic pressure, to the detriment of the rotational component, resulting in electromagnetic stirring. Thus, when the depth δ of the electromagnetic skin is small compared with the characteristic dimension L of the volume of liquid metal, i.e. typically the radius of the crucible, the pressure effect is significant, the liquid metal experiencing a repulsion by the inductor and the surface of said liquid metal being raised up in the form of a dome. The more the frequency increases, that is to say the more the stirring decreases, the greater is the stability of the dome.

The height of the dome is mainly fixed by the intensity of the current in the inductor, that is to say by the intensity of the magnetic field created. If B is the value of this magnetic field, ρ the density of the liquid metal, μ the magnetic permeability and g the gravity, the height h of the dome is:

$$h = B^2/2 \mu \rho g$$

Thus, for high frequencies corresponding to low values of δ compared with the characteristic dimension L of the volume of liquid metal, it is possible to obtain stable domes of large height. The notion of high frequency is quantified by the fact that the screen parameter Rω is large compared to unity, with $R\omega = \mu \sigma \omega L^2$ where a denotes the electrical conductivity of the liquid metal and σ the angular frequency of the inductor current, i.e. ω=2πf.

It is therefore possible to make a dome of liquid metal rise up in a crucible surrounded by an inductor through which an alternating current of well-chosen intensity and well-chosen frequency passes.

In order to prevent contamination or oxidation of the liquid metal 10, the crucible 1 is placed in a chamber 40, illustrated partially, said chamber 40 being filled with an inert or shielding gas, said inert gas being raised to a pressure slightly above atmospheric pressure so as to prevent any penetration of the ambient air into said chamber 40. This chamber 40 has, in its lower part, an opening 40a facing downwards and along the geometrical axis 2 of the crucible 1, the bar 10 passing through said opening 40a with a small gap E2, the pressurized inert gas inside the chamber preventing the ambient air from penetrating into said chamber 15 via said gap E2 left between the lateral surface 31a of the bar 31 and the edge of the opening 40a in the chamber 40. Preferably, grinding bar 31 will be used so as to be able to reduce this gap E2 and consequently the gas leaks. The opening 40a in the chamber 40 is just in front of the feed opening 30 of the crucible 1 and the bar 31 passes simultaneously through said openings 30, 40a from the outside of the chamber right into the crucible 1. It will be recalled that the gaps E1, E2 between the bar 31 and the two openings 30, 40a have the function of allowing mechanical translation of said bar 31 through said openings 30, 40a.

Reference will now be made to FIG. 8. The chamber 40 communicates with an airlock 41 via an internal passage 32 which can be closed off by an internal door 43, said airlock 41 itself being in communication with the outside 45 via an external passage 46 which can also be closed off by an external door 47. A carriage 50 supports a pay-out reel 27 of fiber 15, a first idler pulley 16, a second idler pulley 17 and a take-up reel 28 of fiber 15, said take-up reel 28 pulling on the fiber 15, said fiber 15 being tensioned between the two idler pulleys 16, 17 in order to form a straight segment 18. The fiber 15 is thus placed on the carriage 50 on the outside 45, the internal door 43 being closed, said fiber 15 then being introduced into the chamber 40 by moving the carriage 50 translationally, passing through the airlock 41 in the usual manner, the straight segment 18 of fiber 15 then being introduced into the crucible 1, passing through a slot (not illustrated) between two turns (also not illustrated) of the inductor, the internal door 43 being closed again.

Advantageously, two identical airlocks 41a, 41b will be arranged for example at 90° to each other. Thus, when a carriage 50b is in the process of coating the fiber 15 inside the chamber, the other carriage 50a will be in the process of having the reels of fiber 15 already coated being removed and then of new reels of fiber 15 to be coated being installed, it thus being possible for said installation and said removal to take place off-line while the crucible is in the process of being used.

What is claimed is:

1. Liquid process for coating fibers with metal, comprising the steps of:

holding a liquid metal in a slotted levitation crucible; and drawing a tensioned fiber through the liquid metal, said fiber emerging from said liquid metal at an exit point, the slotted levitation crucible at least partially preventing contact between the liquid metal and a wall of the crucible, wherein the wall of the crucible has first and second orifices located on either side of the liquid metal at orifice points where said liquid metal does not come into contact with said wall, said first and second orifices connected by at least one slot in the wall of the crucible, said at least one slot bringing the inside of the crucible into communication with the outside of the crucible, having a shape of a ruled surface, having a sufficient width so that the fiber can pass through the slot, and located away from the liquid metal such that the slot does not contact the liquid metal, wherein the step of drawing includes the steps of, tensioning the fiber as a straight segment between means of preemption of said fiber, said preemption means being external to the crucible, introducing the fiber into the crucible by making it pass through the at least one slot, passing the tensioned fiber through the first orifice, through the liquid metal, and through the second orifice.

2. Process according to claim 1, wherein the liquid metal is a titanium alloy.

3. Process according to claim 1, wherein the fiber emerges from a surface of the liquid metal at the exit point in a direction near perpendicular to said surface at said exit point, so as to give said surface of the liquid metal an axial symmetry with respect to a fiber in a vicinity of said exit point.

4. Process according to claim 1 wherein the fiber emerges in a near vertical direction from a surface of the liquid metal at the exit point, so as to make the gravitational field axially symmetric with respect to said fiber in a vicinity of said exit point.

5. Process according to claim 1, wherein the slotted crucible and an inductor in the shape of a body of revolution about a geometrical axis are employed and the fiber emerges from a surface of the liquid metal at the exit point, said emergence taking place along a geometrical axis, so as to give an electromagnetic field generated by the inductor in the liquid metal an axial symmetry with respect to the fiber in a vicinity of the exit point.

6. Process according to claim 1, the slotted crucible being placed vertically and having the first orifice facing downward and the second orifice facing upward, wherein the fiber enters via the first orifice at a bottom of the slotted crucible, runs through the liquid metal from the bottom up and emerges via the second orifice at a top of the slotted crucible, so as to orient levitation forces in a direction parallel with the fiber emerging from the liquid metal.

7. Process according to claim 6, the wall of said slotted crucible being segmented, at least two segments being separated by the at least one slot, wherein the fiber is held tensioned in the liquid metal by two idler pulleys external to the slotted crucible and the fiber is shifted away from said liquid metal by a movable pulley, said fiber passing through said at least one slot.

8. Process according to claim 1, wherein the first and second orifices and the at least one slot are positioned opposite a space between two turns of an inductor and the fiber, tensioned from outside the slotted crucible and outside the inductor, is introduced into the slotted crucible by passing between the two turns of the inductor and through the slot.

9. Process according to claim 8, wherein a feed opening is placed in a bottom of the slotted crucible and below the inductor with said feed opening facing downward a bar of metal is introduced via the feed opening, the upper end of said bar is raised into the slotted crucible inside the inductor, and the liquid metal is is shifted away from the edge of the feed opening by levitation, said shift taking place at least over a distance equal to a gap between the bar and an edge of the feed opening.

10. Process according to claim 9, wherein said slotted crucible comprises a cylindrical crucible and the feed opening coincides with the lower end of said cylindrical crucible and a dome of liquid metal forms in the cylindrical crucible above the bar.

11. Process according to claim 9, the slotted crucible being placed inside a chamber containing a pressurized inert gas, wherein an opening is made in a wall of the chamber, said opening in the chamber bringing the inside of the chamber into communication with the outside, said opening in the chamber facing the feed opening of the crucible, and the bar passes through said opening in the chamber.

12. Process according to claim 10, wherein the fiber runs through a surface of the dome of liquid metal at two points of inflection of said surface of the dome.

13. Process according to claim 10, wherein the dome of liquid metal has a height at least equal to twice an internal diameter of the slotted crucible.

* * * * *

UNITED STATES PATENT AND TRADEMARK OFFICE
CERTIFICATE OF CORRECTION

PATENT NO.   : 6,174,570 B1
DATED        : January 16, 2001
INVENTOR(S)  : Dambrine et al.

Page 1 of 1

It is certified that error appears in the above-identified patent and that said Letters Patent is hereby corrected as shown below:

Column 7,
Line 11, delete "SIC";

Column 9,
Line 40, delete "8" and replace with -- $\delta$ --;

Column 10,
Line 3, delete "a" and replace with -- $\sigma$ --;
Line 4, delete "σ" and replace with -- $\omega$ --;

Column 12,
Line 20, after "downward" insert a comma -- , -- a;
Line 23, second occurrence delete "is".

Signed and Sealed this

Twenty-third Day of October, 2001

Attest:

NICHOLAS P. GODICI
*Attesting Officer*    *Acting Director of the United States Patent and Trademark Office*